US010666311B2

(12) United States Patent
Khlat

(10) Patent No.: US 10,666,311 B2
(45) Date of Patent: May 26, 2020

(54) MULTI-AMPLIFIER POWER MANAGEMENT CIRCUIT AND RELATED APPARATUS

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 92 days.

(21) Appl. No.: 15/984,512

(22) Filed: May 21, 2018

(65) Prior Publication Data

US 2019/0109614 A1 Apr. 11, 2019

Related U.S. Application Data

(60) Provisional application No. 62/568,970, filed on Oct. 6, 2017.

(51) Int. Cl.

*H04B 1/40* (2015.01)
*H04B 7/04* (2017.01)
*H04B 1/04* (2006.01)

(52) U.S. Cl.

CPC ............ *H04B 1/40* (2013.01); *H04B 1/0483* (2013.01); *H04B 7/04* (2013.01)

(58) Field of Classification Search

CPC combination set(s) only.
See application file for complete search history.

(56) References Cited

U.S. PATENT DOCUMENTS

2011/0300810 A1* 12/2011 Mikhemar .............. H03F 3/195 455/73
2013/0177106 A1* 7/2013 Levesque .............. H03F 1/0227 375/297
2015/0072671 A1* 3/2015 Rofougaran ............ H04B 1/44 455/418
2018/0152144 A1* 5/2018 Choo .................. H04B 1/0483
2018/0180713 A1* 6/2018 Cohen ..................... G01S 7/006
2018/0262994 A1* 9/2018 Park ...................... H04W 52/42

* cited by examiner

*Primary Examiner* — Ganiyu A Hanidu
(74) *Attorney, Agent, or Firm* — Withrow & Terranova, P.L.L.C.

(57) ABSTRACT

A multi-amplifier power management circuit and related apparatus are provided. The multi-amplifier power management circuit includes a transceiver circuit and an amplifier circuit, which are physically separated (e.g., in different integrated circuits). The amplifier circuit receives a radio frequency (RF) signal from the transceiver circuit and splits the RF signal into a number of RF transmit signals. The amplifier circuit includes a number of amplifiers configured to amplify the RF transmit signals. In examples discussed herein, the multi-amplifier power management circuit can be provided in an apparatus (e.g., a mobile communication device). The amplifier circuit may be collocated with a number of transmit antennas closer to an edge(s) of the apparatus. By collocating the amplifier circuit and the transmit antennas closer to the edge(s) of the apparatus, it may be possible to reduce RF signal radiation distance, thus helping to improve radiation efficiency and reduce heat dissipation in the apparatus.

20 Claims, 4 Drawing Sheets

MULTI-AMPLIFIER POWER MANAGEMENT CIRCUIT AND RELATED APPARATUS

RELATED APPLICATIONS

This application claims the benefit of provisional patent application Ser. No. 62/568,970, filed Oct. 6, 2017, the disclosure of which is hereby incorporated herein by reference in its entirety.

FIELD OF THE DISCLOSURE

The technology of the disclosure relates generally to millimeter wave (mmWave) radio frequency (RF) power amplifier circuits.

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

Fifth-generation (5G) new radio (NR) (5G-NR) wireless communication technology has been widely regarded as the next wireless communication standard beyond the current third-generation (3G) communication standard, such as wideband code division multiple access (WCDMA), and fourth-generation (4G) communication standard, such as long-term evolution (LTE). As such, a 5G-NR capable mobile communication device is expected to achieve significantly higher data rates, improved coverage range, enhanced signaling efficiency, and reduced latency compared to a conventional mobile communication device supporting only the 3G and 4G communication standards.

The 5G-NR capable mobile communication device can be configured to transmit an RF signal(s) in a millimeter wave (mmWave) radio frequency (RF) spectrum(s), such as a RF spectrum above 28 GHz. RF signals transmitted in the mmWave RF spectrum are susceptible to attenuation and interference. In this regard, the 5G-NR capable mobile communication device typically employs amplifier array and antenna array to shape the RF signal(s) into a directional RF beam(s) for transmission in the mmWave RF spectrum(s). Depending on the application scenarios supported by the 5G-NR capable mobile communication device, the amplifier array may be configured to include from tens to hundreds of power amplifiers. Notably, power amplifiers in the amplifier array can generate excessive heat when operating at suboptimal efficiency. Moreover, the mobile communication device may be provided in a metal housing that can degrade RF signal radiation efficiency. As such, it may be desired to improve radiation efficiency and reduce heat dissipation in the 5G-NR capable mobile communication device.

SUMMARY

Embodiments of the disclosure relate to a multi-amplifier power management circuit and related apparatus. The multi-amplifier power management circuit includes a transceiver circuit and an amplifier circuit, which are physically separated (e.g., in different integrated circuits). The amplifier circuit receives a radio frequency (RF) signal from the transceiver circuit and splits the RF signal into a number of RF transmit signals. The amplifier circuit includes a number of amplifiers configured to amplify the RF transmit signals. In examples discussed herein, the multi-amplifier power management circuit can be provided in an apparatus (e.g., a mobile communication device). Specifically, the amplifier circuit may be collocated with a number of transmit antennas closer to an edge(s) (e.g., on a housing) of the apparatus. By collocating the amplifier circuit and the transmit antennas closer to the edge(s) of the apparatus, it may be possible to reduce RF signal radiation distance, thus helping to improve radiation efficiency and reduce heat dissipation in the apparatus.

In one aspect, a multi-amplifier power management circuit is provided. The multi-amplifier power management circuit includes a transceiver circuit that includes receiver circuitry and transmitter circuitry. The transmitter circuitry is configured to generate an RF signal. The multi-amplifier power management circuit also includes an amplifier circuit coupled to the transceiver circuit. The amplifier circuit includes transmit signal circuitry configured to receive and split the RF signal into a number of RF transmit signals. The amplifier circuit also includes a number of amplifiers configured to amplify the RF transmit signals based on a number of modulated voltages. The amplifier circuit also includes a number of transmit antenna ports coupled to the amplifiers, respectively. The transmit antenna ports are configured to output the RF transmit signals to a transmit antenna circuit.

In another aspect, an apparatus is provided. The apparatus includes a multi-amplifier power management circuit. The multi-amplifier power management circuit includes a transceiver circuit that includes receiver circuitry and transmitter circuitry. The transmitter circuitry is configured to generate an RF signal. The multi-amplifier power management circuit also includes an amplifier circuit coupled to the transceiver circuit. The amplifier circuit includes transmit signal circuitry configured to receive and split the RF signal into a number of RF transmit signals. The amplifier circuit also includes a number of amplifiers configured to amplify the RF transmit signals based on a number of modulated voltages. The amplifier circuit also includes a number of transmit antenna ports coupled to the amplifiers, respectively. The transmit antenna ports are configured to output the RF transmit signals to a transmit antenna circuit.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 3:
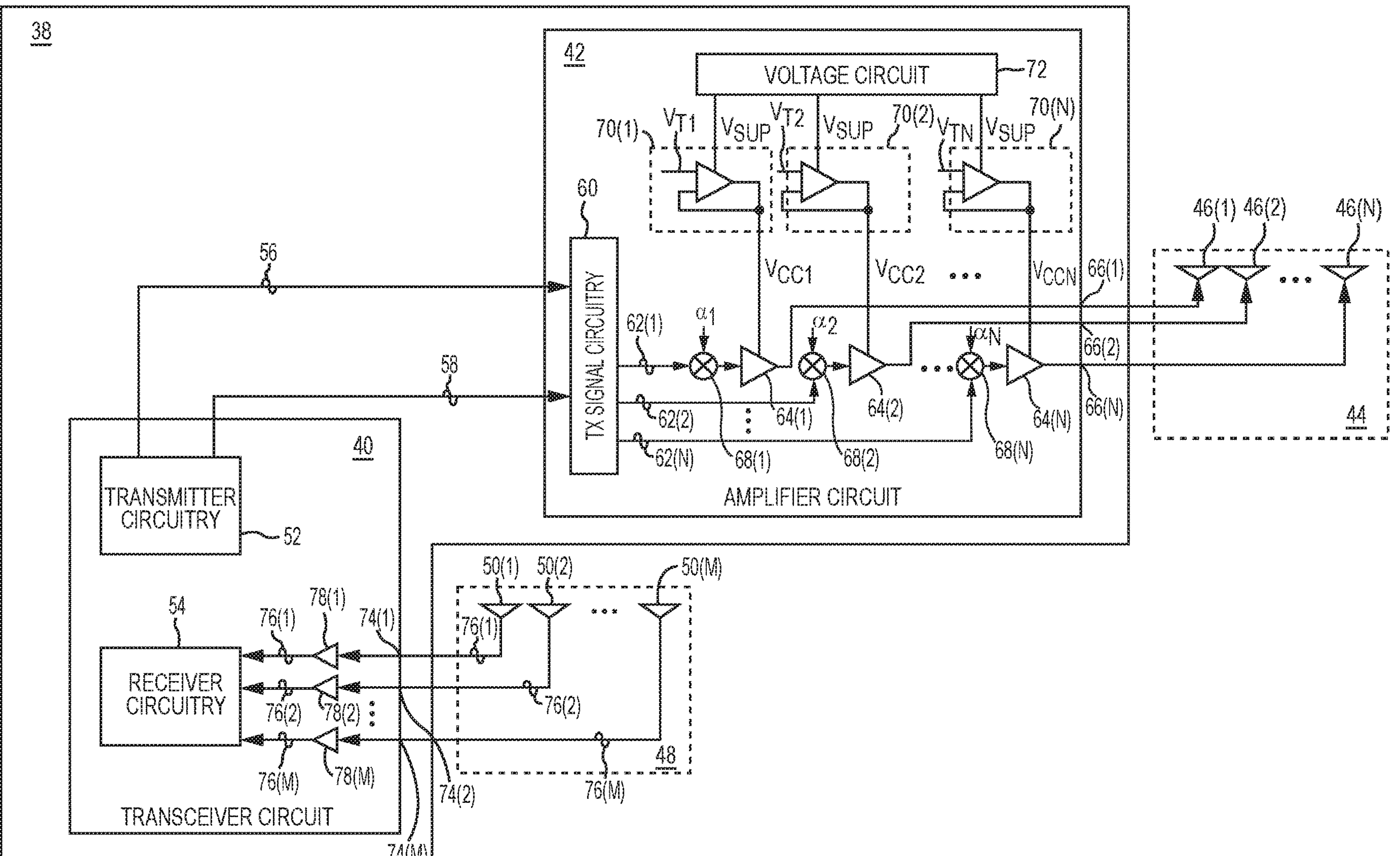
Figure 4:
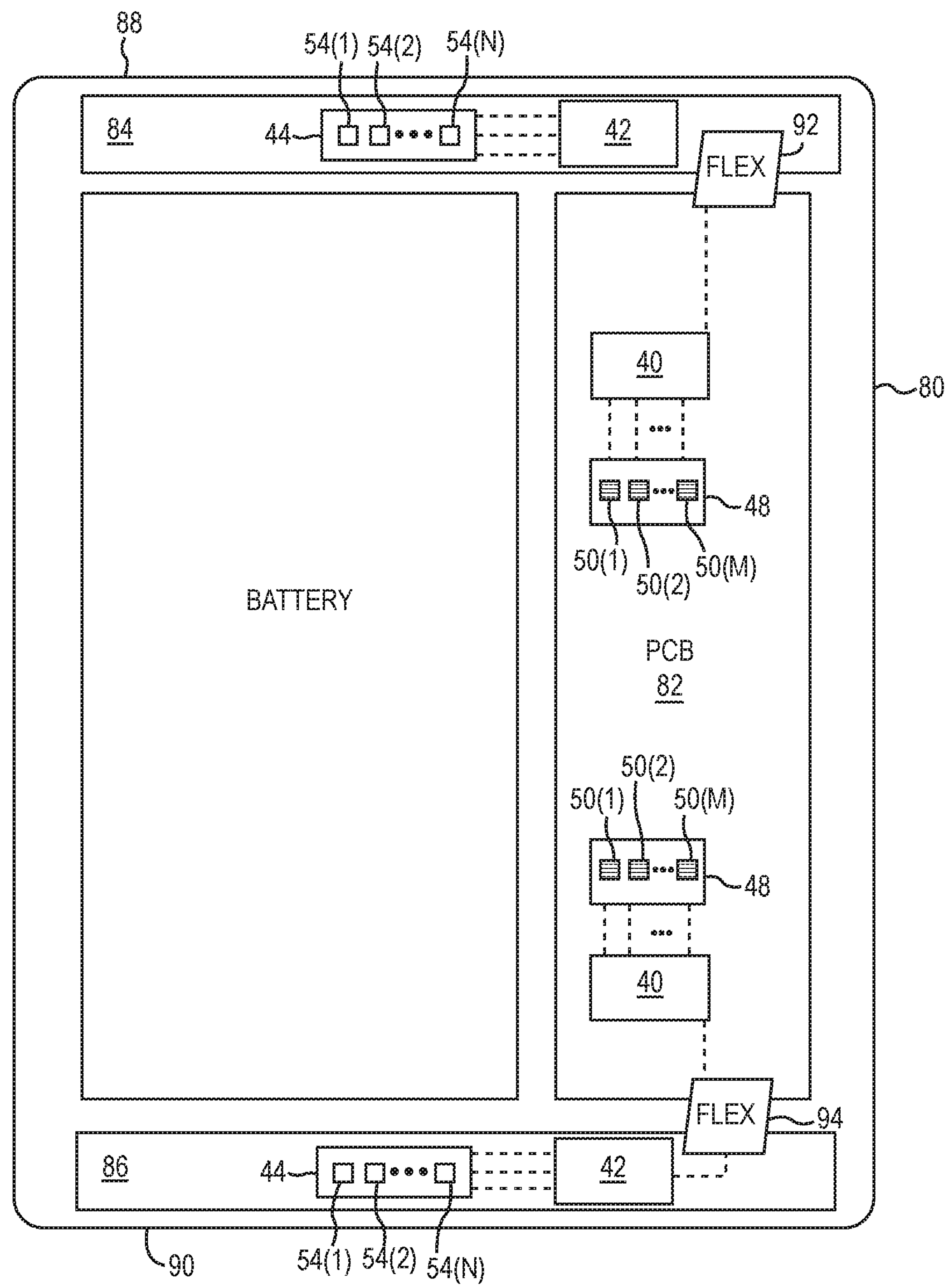

FIG. 3 is a schematic diagram of an exemplary multi-amplifier power management circuit configured to reduce radio frequency (RF) signal routing distance and insertion loss according an embodiment of the present disclosure; and FIG. 4 is a schematic diagram of an exemplary apparatus employing the multi-amplifier power management circuit of FIG. 3 according to an embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a multi-amplifier power management circuit and related apparatus. The multi-amplifier power management circuit includes a transceiver circuit and an amplifier circuit, which are physically separated (e.g., in different integrated circuits). The amplifier circuit receives a radio frequency (RF) signal from the transceiver circuit and splits the RF signal into a number of RF transmit signals. The amplifier circuit includes a number of amplifiers configured to amplify the RF transmit signals. In examples discussed herein, the multi-amplifier power management circuit can be provided in an apparatus (e.g., a mobile communication device). Specifically, the amplifier circuit may be collocated with a number of transmit antennas closer to an edge(s) (e.g., on a housing) of the apparatus. By collocating the amplifier circuit and the transmit antennas closer to the edge(s) of the apparatus, it may be possible to reduce RF signal radiation distance, thus helping to improve radiation efficiency and reduce heat dissipation in the apparatus.

Figure 1:
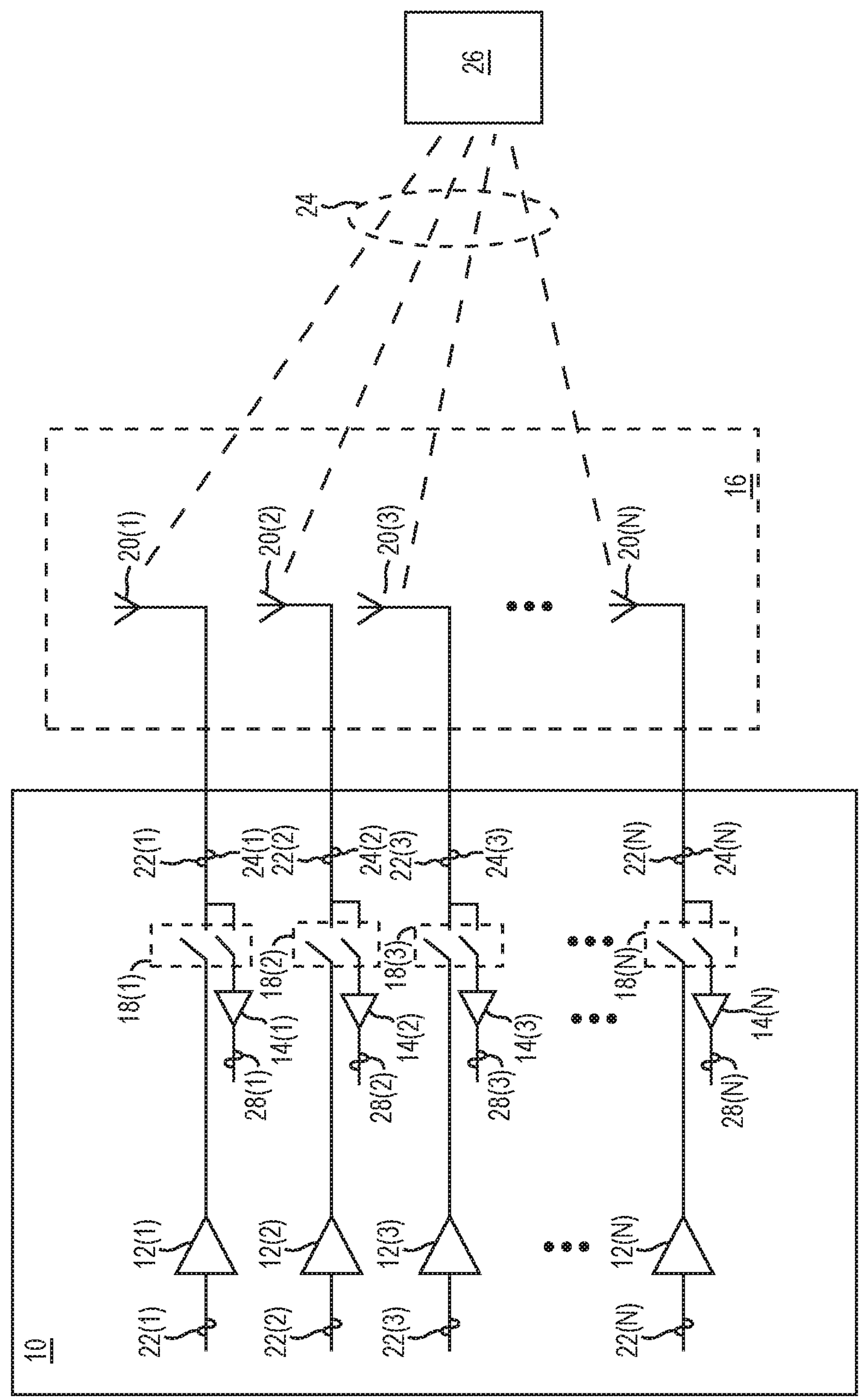
FIG. 1 is a schematic diagram of an exemplary conventional multi-amplifier power management circuit.
Figure 2:
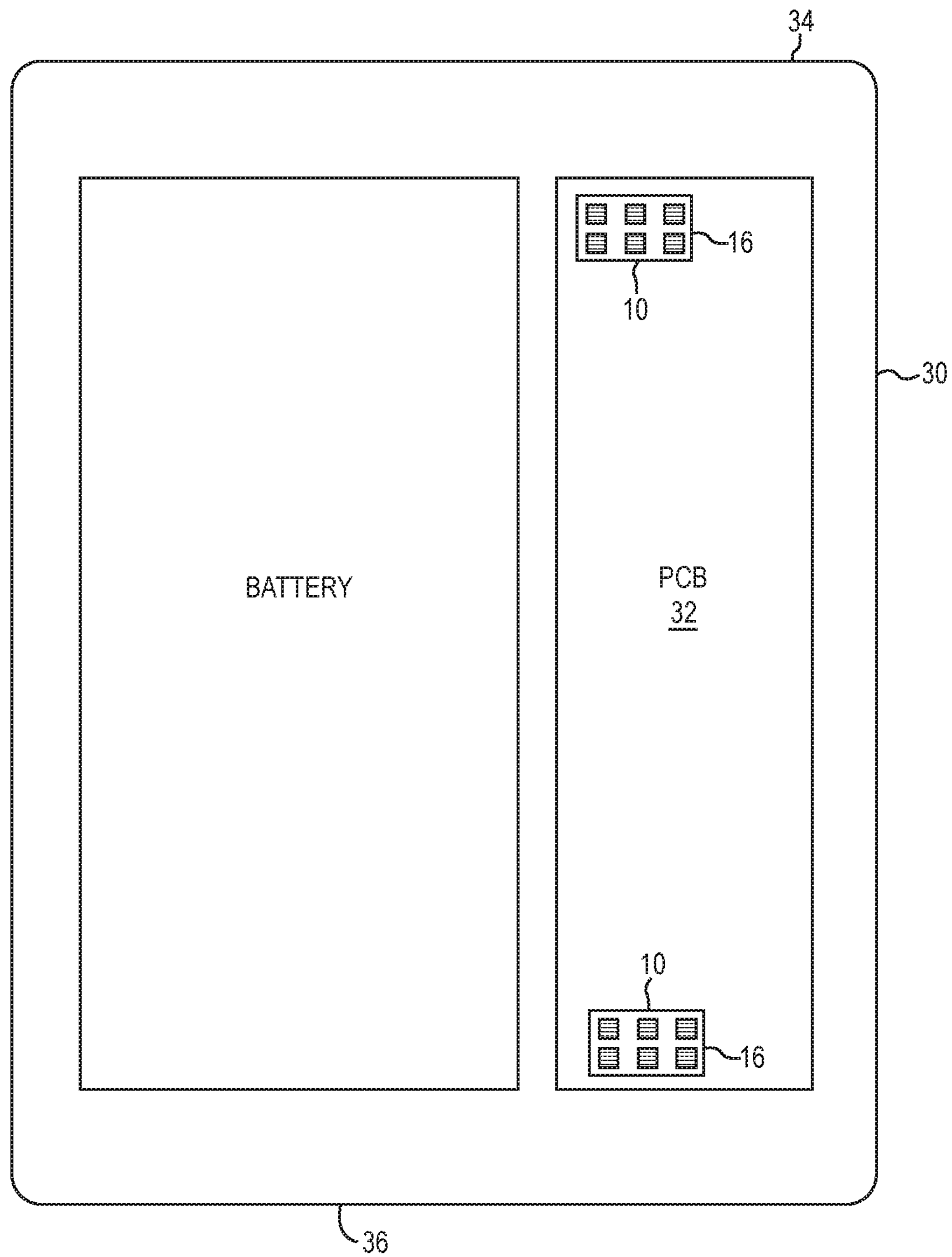
FIG. 2 is a schematic diagram of an exemplary conventional apparatus employing the conventional multi-amplifier power management circuit of FIG. 1.

Before discussing the multi-amplifier power management and the related apparatus, a discussion of a conventional multi-amplifier power management circuit and a related apparatus is first provided with reference to FIGS. 1 and 2, respectively. The discussion of specific exemplary aspects of a multi-amplifier power management circuit and related apparatus starts below with reference to FIG. 3.

In this regard, FIG. 1 is a schematic diagram of an exemplary conventional multi-amplifier power management circuit 10. The conventional multi-amplifier power management circuit 10 includes a number of amplifiers 12(1)-12(N) and a number of low-noise amplifiers (LNAs) 14(1)-14(N). The amplifiers 12(1)-12(N) and the LNAs 14(1)-14(N) are coupled to an antenna circuit 16 via a number of RF switch circuits 18(1)-18(N), respectively. The antenna circuit 16 includes a number of antennas 20(1)-20(N) coupled to the RF switch circuits 18(1)-18(N), respectively.

The amplifiers 12(1)-12(N) are configured to amplify a number of RF transmit signals 22(1)-22(N) for transmission via the antennas 20(1)-20(N), respectively. The antennas 20(1)-20(N) may be configured to transmit the RF transmit signals 22(1)-22(N) in a formed RF beam 24 toward a device 26. The antennas 20(1)-20(N) are also configured to receive a number of RF receive signals 28(1)-28(N) from the device 26. The LNAs 14(1)-14(N) are configured to receive the RF receive signals 28(1)-28(N) via the antennas 20(1)-20(N) and amplify the RF receive signals 28(1)-28(N), respectively.

The RF switch circuits 18(1)-18(N) are configured to alternately couple the amplifiers 12(1)-12(N) and the LNAs 14(1)-14(N) to the antennas 20(1)-20(N), respectively. In this regard, the amplifiers 12(1)-12(N) provide the RF transmit signals 22(1)-22(N) to the antennas 20(1)-20(N) for transmission to the device 26 when the RF switch circuits 18(1)-18(N) couple the amplifiers 12(1)-12(N) to the antennas 20(1)-20(N). Likewise, the LNAs 14(1)-14(N) receive the RF receive signals 28(1)-28(N) from the antennas 20(1)-20(N) when the RF switch circuits 18(1)-18(N) couple the LNAs 14(1)-14(N) to the antennas 20(1)-20(N).

By including the RF switch circuits 18(1)-18(N) in the conventional multi-amplifier power management circuit 10, it is possible to share the antennas 20(1)-20(N) between transmitting the RF transmit signals 22(1)-22(N) and receiving the RF receive signals 28(1)-28(N). Nevertheless, the RF switch circuits 18(1)-18(N) can also cause insertion losses in the RF transmit signals 22(1)-22(N) and/or the RF receive signals 28(1)-28(N).

FIG. 2 is a schematic diagram of an exemplary conventional apparatus 30 employing the conventional multi-amplifier power management circuit 10 of FIG. 1. Common elements between FIGS. 1 and 2 are shown therein with common element numbers and will not be re-described herein.

The conventional apparatus 30 includes a main circuit 32, which may be a printed circuit board (PCB), a top edge 34 (e.g., top housing), and a bottom edge 36 (e.g., bottom housing). One or more of the conventional multi-amplifier power management circuit 10, together with one of more of the antenna circuit 16 of FIG. 1 can be provided on the main circuit 32. Notably, the RF transmit signals 22(1)-22(N) are radiated from the top edge 34 and/or the bottom edge 36. As such, providing the conventional multi-amplifier power management circuit 10 and the antenna circuit 16 on the main circuit 32 can increase radiation distance of the RF transmit signals 22(1)-22(N). Consequently, the RF transmit signals 22(1)-22(N) may suffer increased degradation, thus compromising radiation efficiency of the conventional apparatus 30. As such, it may be desirable to reduce insertion loss and improve radiation efficiency of the conventional apparatus 30.

In this regard, FIG. 3 is a schematic diagram of an exemplary multi-amplifier power management circuit 38 configured to reduce RF signal routing distance and insertion loss according to an embodiment of the present disclosure. The multi-amplifier power management circuit 38 includes a transceiver circuit 40 and an amplifier circuit 42. The transceiver circuit 40 and the amplifier circuit 42 may be provided in different semiconductor dies (integrated circuits). The amplifier circuit 42 may be collocated (e.g., provided in the same electrical circuit) with a transmit antenna circuit 44, which includes a number of transmit antennas 46(1)-46(N) configured exclusively for transmitting RF signals. The transceiver circuit 40 is collocated (e.g., provided in the same electrical circuit) with a receive antenna circuit 48, which includes a number of receive antennas 50(1)-50(M) configured exclusively for receiving RF signals. By configuring the transmit antenna circuit 44 and the receive antenna circuit 48 to exclusively transmit and exclusively receive the RF signals, respectively, it may be possible to eliminate the RF switch circuits 18(1)-18(N) of FIG. 1, thus helping to reduce insertion losses in the RF signals. Further, it may also be possible to set impedance for the amplifier circuit 42 and the transceiver circuit 40 to better match the impedance of the transmit antenna circuit 44 and the receive antenna circuit 48, respectively.

The transceiver circuit 40 includes transmitter circuitry 52 and receiver circuitry 54. The transmitter circuitry 52 is configured to generate an RF signal 56 and a clock signal 58. The amplifier circuit 42 includes transmit signal circuitry 60 configured to receive the RF signal 56 and the clock signal 58 from the transmitter circuitry 52. In a non-limiting example, the transmit signal circuitry 60 can function as a controller for configuring/controlling the amplifier circuit 42 and/or communicating with the transceiver circuit 40. The transmit signal circuitry 60 is configured to split the RF signal 56 into a number of RF transmit signals 62(1)-62(N).

The RF transmit signals 62(1)-62(N) may be identical to the RF signal 56, but may have different amplitudes and/or phases from the RF signal 56.

The amplifier circuit 42 includes a number of amplifiers 64(1)-64(N) configured to amplify the RF transmit signals 62(1)-62(N) based on a number of modulated voltages $V_{CC1}$-$V_{CCN}$, respectively. The amplifier circuit 42 includes a number of transmit antenna ports 66(1)-66(N) that are coupled to the transmit antennas 46(1)-46(N), respectively. In this regard, the amplifiers 64(1)-64(N) provide the RF transmit signals 62(1)-62(N) to the transmit antennas 46(1)-46(N) via the antenna ports 66(1)-66(N), respectively. Given that the transmit antennas 46(1)-46(N) are configured exclusively for transmitting the RF transmit signals 62(1)-62(N), it is possible to eliminate RF switch circuits, such as the RF switch circuits 18(1)-18(N) of FIG. 1, thus helping to reduce insertion losses resulting from the RF switch circuits. In a non-limiting example, it may be possible to reduce the insertion loss in the RF transmit signals 62(1)-62(N) by approximately 1 dB in a 28 GHz millimeter wave (mmWave) spectrum by eliminating the RF switch circuits 18(1)-18(N).

In a non-limiting example, the transmit antennas 46(1)-46(N) are configured to transmit the RF transmit signals 62(1)-62(N) simultaneously in a formed RF beam, which is also known as RF beamforming. Notably, the RF transmit signals 62(1)-62(N) transmitted by the transmit antennas 46(1)-46(N) can arrive at a receiver via different propagation paths and thus are subject to different delays and/or attenuations. As such, the RF transmit signals 62(1)-62(N) need to be pre-modulated in a number of phase and amplitude terms to ensure that the RF transmit signals 62(1)-62(N) transmitted from the transmit antennas 46(1)-46(N) can arrive at the receiver simultaneously. In this regard, the amplifier circuit 42 includes a number of transmit signal modulators 68(1)-68(N) coupled to the amplifiers 64(1)-64(N), respectively. The transmit signal modulators 68(1)-68(N) are configured to modulate the RF transmit signals 62(1)-62(N) into a number phase and amplitude terms $\alpha_1$-$\alpha_N$, respectively. Notably, the phase and amplitude terms $\alpha_1$-$\alpha_N$ are predetermined to compensate for the delays and/or attenuations associated with the different propagation paths of the RF transmit signals 62(1)-62(N). As a result, the RF transmit signals 62(1)-62(N) may arrive at the receiver simultaneously, thus allowing the receiver to linearly combine the RF transmit signals 62(1)-62(N). In this regard, the transmit signal modulators 68(1)-68(N) use the phase and amplitude terms $\alpha_1$-$\alpha_N$ to make the RF transmit signals 62(1)-62(N) linearly coherent.

The amplifier circuit 42 includes a number of tracker circuits 70(1)-70(N) configured to generate and provide the modulated voltages $V_{CC1}$-$V_{CCN}$ to the amplifiers 64(1)-64(N), respectively. In one non-limiting example, the tracker circuits 70(1)-70(N) can generate the modulate voltages $V_{CC1}$-$V_{CCN}$ as envelope tracking (ET) modulated voltages in accordance to a number of ET target voltages $V_{T1}$-$V_{TN}$, respectively. In another non-limiting example, the tracker circuits 70(1)-70(N) can generate the modulate voltages $V_{CC1}$-$V_{CCN}$ as average power tracking (APT) modulated voltages.

The tracker circuits 70(1)-70(N) may be configured to generate the modulated voltages $V_{CC1}$-$V_{CCN}$ based on a common supply voltage $V_{SUP}$ provided by a voltage circuit 72. In a non-limiting example, the voltage circuit 72 can be an inductor-based buck-boost circuit or a capacitor-based buck-boost circuit configured to provide a constant voltage to the tracker circuits 70(1)-70(N) as the common supply voltage $V_{SUP}$.

The transceiver circuit 40 can include a number of receive antenna ports 74(1)-74(M) for coupling to the receive antennas 50(1)-50(M) to receive a number of RF receive signals 76(1)-76(M), respectively. The transceiver circuit 40 includes a number of low-noise amplifiers (LNAs) 78(1)-78(M) configured to receive the RF receive signals 76(1)-76(M) via the receive antenna ports 74(1)-74(M), respectively. Given that the receive antennas 50(1)-50(M) are configured exclusively for receiving the RF receive signals 76(1)-76(M), it is possible to eliminate RF switch circuits, such as the RF switch circuits 18(1)-18(N) of FIG. 1, thus helping to reduce insertion losses resulting from the RF switch circuits. In a non-limiting example, it may be possible to reduce the insertion loss in the RF receive signals 76(1)-76(M) by approximately 1 dB in the 28 GHz mmWave spectrum by eliminating the RF switch circuits 18(1)-18(N).

The multi-amplifier power management circuit 38 may be provided in an apparatus, such as a mobile communication device, to help reduce RF signal routing distance for improved radiation efficiency, power consumption, and heat dissipation. In this regard, FIG. 4 is a schematic diagram of an apparatus 80 employing the multi-amplifier power management circuit 38 of FIG. 3 according to an embodiment of the present disclosure. Common elements between FIGS. 3 and 4 are shown therein with common element numbers and will not be re-described herein.

The apparatus 80 includes a main circuit 82, a top antenna circuit 84 and a bottom antenna circuit 86. In one non-limiting example, the top antenna circuit 84 and the bottom antenna circuit 86 are provided on a top edge 88 (e.g., top housing) of the apparatus 80 and a bottom edge 90 (e.g., bottom housing) of the apparatus 80. The top antenna circuit 84 and the bottom antenna circuit 86 are both separated from the main circuit 82. The top antenna circuit 84 may be electrically coupled to the main circuit 82 via a first flex circuit 92 and the bottom antenna circuit 86 may be electrically coupled to the main circuit 82 via a second flex circuit 94.

In one non-limiting example, the amplifier circuit 42 and the transmit antenna circuit 44 can be provided in the top antenna circuit 84 and/or the bottom antenna circuit 86. Notably, the amplifier circuit 42 and the transmit antenna circuit 44 can be provided in both the top antenna circuit 84 and the bottom antenna circuit 86 to help mitigate antenna blocking issues caused by users' hands. In another non-limiting example, the transmit antenna circuit 44 can be provided in the top antenna circuit 84 and/or the bottom antenna circuit 86, while the amplifier circuit 42 is provided in the first flex circuit 92 and/or the second flex circuit 94. By providing the amplifier circuit 42 and the transmit antenna circuit 44 closer to the top edge 88 and/or the bottom edge 90, it may be possible to reduce radiation distance of the RF transmit signals 62(1)-62(N), thus helping to reduce transmit signal degradation and improve radiation efficiency of the apparatus 80.

The transceiver circuit 40 and the receive antenna circuit 48 may be provided in the main circuit 82. Notably, the main circuit 82 can include more than one of the transceiver circuit 40 and the receive antenna circuit 48 to enable diversity receive function based on multiple-input multiple-output (MIMO) operation.

Those skilled in the art will recognize improvements and modifications to the preferred embodiments of the present disclosure. All such improvements and modifications are considered within the scope of the concepts disclosed herein and the claims that follow.

What is claimed is:

1. A multi-amplifier power management circuit comprising:

a transceiver circuit comprising receiver circuitry and transmitter circuitry, the transmitter circuitry configured to generate a radio frequency (RF) signal; and an amplifier circuit coupled to the transceiver circuit, the amplifier circuit comprising:

transmit signal circuitry configured to receive and split the RF signal into a plurality of RF transmit signals;

a plurality of amplifiers configured to amplify the plurality of RF transmit signals based on a plurality of modulated voltages; and a plurality of transmit antenna ports coupled to the plurality of amplifiers, respectively, the plurality of transmit antenna ports configured to output the plurality of RF transmit signals to a transmit antenna circuit exclusively configured to transmit the plurality of RF transmit signals.

2. The multi-amplifier power management circuit of claim 1 wherein the amplifier circuit further comprises a plurality of transmit signal modulators provided between the transmit signal circuitry and the plurality of amplifiers, the plurality of transmit signal modulators configured to modulate the plurality of RF transmit signals into a plurality of phase and amplitude terms such that the plurality of RF transmit signal is linearly coherent.

3. The multi-amplifier power management circuit of claim 1 wherein:

the transceiver circuit further comprises a plurality of receive antenna ports configured to receive a plurality of RF receive signals from a receive antenna circuit; and the receiver circuitry is configured to receive the plurality of RF receive signals from the plurality of receive antenna ports.

4. The multi-amplifier power management circuit of claim 3 wherein:

the transmit antenna circuit comprises a plurality of transmit antennas configured to transmit the plurality of RF transmit signals in a formed RF beam; and the receive antenna circuit comprises a plurality of receive antennas configured to receive the plurality of RF receive signals, respectively.

5. The multi-amplifier power management circuit of claim 4 wherein:

the plurality of transmit antennas is exclusively configured to transmit the plurality of RF transmit signals; and the plurality of receive antennas is exclusively configured to receive the plurality of RF receive signals.

6. The multi-amplifier power management circuit of claim 4 wherein the transceiver circuit and the amplifier circuit are provided in different integrated circuits.

7. The multi-amplifier power management circuit of claim 1 wherein the amplifier circuit further comprises a plurality of tracker circuits configured to generate the plurality of modulated voltages based on a common supply voltage.

8. The multi-amplifier power management circuit of claim 7 wherein the amplifier circuit further comprises a voltage circuit configured to provide the common supply voltage to the plurality of tracker circuits.

9. The multi-amplifier power management circuit of claim 7 wherein the plurality of tracker circuits is configured to generate the plurality of modulated voltages as envelope tracking (ET) modulated voltages.

10. The multi-amplifier power management circuit of claim 7 wherein the plurality of tracker circuits is configured to generate the plurality of modulated voltages as average power tracking (APT) modulated voltages.

11. An apparatus comprising:

a transmit antenna circuit exclusively configured to transmit a plurality of radio frequency (RF) transmit signals; and a multi-amplifier power management circuit comprising:

a transceiver circuit comprising receiver circuitry and transmitter circuitry, the transmitter circuitry configured to generate an RF signal; and an amplifier circuit coupled to the transceiver circuit, the amplifier circuit comprising:

transmit signal circuitry configured to receive and split the RF signal into the plurality of RF transmit signals;

a plurality of amplifiers configured to amplify the plurality of RF transmit signals based on a plurality of modulated voltages; and a plurality of transmit antenna ports coupled to the plurality of amplifiers, respectively, the plurality of transmit antenna ports configured to output the plurality of RF transmit signals to the transmit antenna circuit.

12. The apparatus of claim 11 wherein:

the transceiver circuit further comprises a plurality of receive antenna ports configured to receive a plurality of RF receive signals from a receive antenna circuit; and the receiver circuitry is configured to receive the plurality of RF receive signals from the plurality of receive antenna ports.

13. The apparatus of claim 12 wherein:

the transmit antenna circuit comprises a plurality of transmit antennas configured to transmit the plurality of RF transmit signals in a formed RF beam; and the receive antenna circuit comprises a plurality of receive antennas configured to receive the plurality of RF receive signals, respectively.

14. The apparatus of claim 13 wherein:

the plurality of transmit antennas is exclusively configured to transmit the plurality of RF transmit signals; and the plurality of receive antennas is exclusively configured to receive the plurality of RF receive signals.

15. The apparatus of claim 13 further comprising:

a main circuit;

a top antenna circuit provided on a top edge of the apparatus and separate from the main circuit; and a bottom antenna circuit provided on a bottom edge of the apparatus and separate from the main circuit.

16. The apparatus of claim 15 wherein:

the top antenna circuit is coupled to the main circuit via a first flex circuit; and the bottom antenna circuit is coupled to the main circuit via a second flex circuit.

17. The apparatus of claim 15 wherein the main circuit comprises the transceiver circuit.

18. The apparatus of claim 17 wherein the main circuit further comprises the receive antenna circuit.

19. The apparatus of claim 15 wherein at least one antenna circuit among the top antenna circuit and the bottom antenna circuit comprises the amplifier circuit.

20. The apparatus of claim 19 wherein the at least one antenna circuit among the top antenna circuit and the bottom antenna circuit further comprises the transmit antenna circuit.

* * * * *